(12) United States Patent
Nover et al.

(10) Patent No.: US 6,342,100 B1
(45) Date of Patent: Jan. 29, 2002

(54) BIMOLECULAR COATED CALCIUM CARBONATE AND PROCESS OF PRODUCTION THEREOF

(75) Inventors: Christoph Nover; Helmut Dillenburg, both of Rheinberg (DE)

(73) Assignee: Solvay Soda Deutschland GmbH, Hannover (DE)

( * ) Notice: Subject to any disclaimer, the term of this patent is extended or adjusted under 35 U.S.C. 154(b) by 0 days.

(21) Appl. No.: 09/486,827

(22) PCT Filed: Aug. 21, 1998

(86) PCT No.: PCT/EP98/05337

§ 371 Date: Mar. 3, 2000

§ 102(e) Date: Mar. 3, 2000

(87) PCT Pub. No.: WO99/11721

PCT Pub. Date: Mar. 11, 1999

(30) Foreign Application Priority Data

Sep. 3, 1997 (DE) .......................................... 197 38 481

(51) Int. Cl.$^7$ .............................. C09C 1/02; C09C 3/08
(52) U.S. Cl. ....................... 106/464; 106/465; 423/430; 524/425; 523/210; 162/181.1; 428/403
(58) Field of Search ................................. 106/464, 465; 162/181.1; 524/425; 523/210; 423/430; 428/403

(56) References Cited

U.S. PATENT DOCUMENTS

| 4,753,679 A | * | 6/1988 | Damiano et al. ........... 106/465 |
| 5,015,669 A | | 5/1991 | Aumann et al. |
| 5,135,967 A | | 8/1992 | Aumann et al. |
| 5,380,361 A | * | 1/1995 | Gill ........................... 106/465 |

FOREIGN PATENT DOCUMENTS

DE 958830 * 2/1957

* cited by examiner

*Primary Examiner*—Michael Marcheschi
(74) *Attorney, Agent, or Firm*—Crowell & Moring LLP

(57) ABSTRACT

Bimolecular coated calcium carbonate and a process for controlled surface treatment of calcium carbonate according to which an amount of coating determined from the mean particle diameter (dp) of the calcium carbonate is contacted with the calcium carbonate particles. The way in which the amount of coating agent is determined enables purposeful control of the properties of the coated calcium carbonate particles to adapt them for use as functional filling materials in different technical applications.

12 Claims, No Drawings

BIMOLECULAR COATED CALCIUM CARBONATE AND PROCESS OF PRODUCTION THEREOF

BACKGROUND OF THE INVENTION

The invention relates to a bimolecularly coated calcium carbonate, as well as to a method for the controlled surface treatment of calcium carbonate.

The use of finely ground limestone or precipitated calcium carbonate as a filler, for example, for rubber, plastics, paper or paints, is known. Likewise, it is known that the dispersibility of the calcium carbonate particles in or the affinity of the particles towards the substance or the mixture, to which the calcium carbonate is to be added as a filler, can be improved or increased by a surface treatment with, for example, fatty acids or their salts.

The German patent 958 830 describes a method for improving the properties of calcium carbonate, in which the calcium carbonate is ground in the presence of surface-active materials. In order to achieve complete coverage of the calcium carbonate particles, the amount of surface-active materials added can fluctuate appreciably. According to the German patent 958 830, the limits lie between 0.1 and 40% by weight, based on the amount of calcium carbonate.

From the German patent 38 01 649 or the German patent 39 00 054, it is known that compositions, which protect the subsoil and have improved flowability, can be produced if the fillers, especially calcium carbonate, are coated completely or partially with surface-active materials. These publications do not provide details concerning the degree of the partial surface coverage.

Coated calcium carbonate is required and used for different applications as a functional filler. The different applications also place different requirements on the coated calcium carbonate. These requirements are described, for example, by the liquid limit in the plasticizer mixture (Bingham method). Certain liquid limits have proven to be particularly suitable for the individual applications.

Based on the previously known methods for treating the surface calcium carbonate particles, it could be assumed that there is a relationship between the degree of coating and the liquid limit. A method for controlling the application properties, which utilizes this relationship, has not previously become known.

SUMMARY OF THE INVENTION

It is an object of the invention to provide a method for the preparation of coated calcium carbonate with a defined degree of coating and with defined properties.

Pursuant to the invention, this objective is accomplished owing to the fact that the required amount of coating agent is determined on the basis of the average particle diameter (dp) of the calcium carbonate. Accordingly, the application properties of the fillers can be controlled by the selective variation of particular diameters and/or of the degree of coating.

In particular, properties such as the liquid limit, viscosity, thixotropy, dispersibility or adhesion capability of mixtures can be controlled and affected by coated calcium carbonate as functional filler.

The calcium carbonate, which is treated pursuant to the invention, can be natural calcium carbonate or chalk or synthetic calcium carbonate, such as precipitated calcium carbonate, which has been ground dry or wet.

Usually, calcium carbonate is used as filler, which has an average particle diameter of not more than 50 μm and preferably of less than 20 μm and particularly of less than 5 μm. Particles with an average particle size of 0.005 to 5 μm and particularly of 0.01 to 1 μm are preferred.

Within the scope of the invention, coating agents are materials, which can be held by surface activity on the calcium carbonate particles.

DESCRIPTION OF PREFERRED EMBODIMENTS

In one embodiment of the invention, saturated and/or unsaturated carboxylic acids, such as fatty acids, substituted fatty acids, their salts or fatty alcohols, to name but a few suitable materials, are used as coating agents. In a preferred embodiment, $C_2$ to $C_{32}$ fatty acids and preferably $C_{14}$ to $C_{22}$ fatty acids, such as stearic acid, or the alkali or ammonium salts of the corresponding fatty acids are used as coating agents.

The calcium carbonate is brought into contact with the coating agent in a known manner. The coating agent is dispersed or emulsified in liquid or solid form, preferably as an emulsion with the dispersed calcium carbonate, for example, during the grinding process or during and/or after the precipitation, the coating agent adhering to the surface of the calcium carbonate.

In one embodiment, the treatment of the calcium carbonate with the surface-active material takes place in emulsified form in an aqueous system. At the same time, it surprisingly was found that the calcium carbonate has a bimolecular coating, that is, a double layer. The space required by stearic acid as coating agent, that is, how much calcium carbonate particle surface area must be present, was calculated by known methods. The degree of coverage was determined by ESCA measurements and compared with the space required. By these means, it was determined that a double layer must be present. It was furthermore possible to determine that 20 to 60% of the crystalline surface of the calcium carbonate particles are coated in the form of a double layer.

The mechanism of forming the double layer can be explained in the following manner:

In a mixture of water, sodium hydroxide and stearic acid, spherical micelles of the sodium stearate are formed. This emulsion is brought into contact with the calcium carbonate, for example, by mixing a suspension of calcium carbonate with the emulsion.

The micelles approach the calcium carbonate surface and contact this surface at a point, a salt-exchange reaction taking place.

By deformation of the micelles, a constantly increasing number of sodium stearate ions contact the calcium carbonate surface. Since the micelles do not open up and, instead, are only deformed, the described double layer is formed.

The space required by a stearate head group is about 20 Å. For example, calcium carbonate, with a BET surface area of 21 $m^2$, is coated with 4.8% of stearate. This corresponds to 100% coverage in the case of a monolayer. ESCA measurements show that 49% of the carbonate surface, based on the total surface area, is covered and, moreover, in the form of a double layer.

The liquid limit according to Bingham in a plasticizer mixture is usually given as a typical characteristic of the suitability of calcium carbonates as a filler.

It was found that the ratio of coated to uncoated surface affects the liquid limit.

The degree of coating of the calcium carbonate also varies depending on the nature and amount of the coating agent. The liquid limit in the plasticizer mixture is therefore determined in a known manner and, after that, related to the degree of coating.

By using the method of the invention, it is possible to control the degree of coating so precisely, that the coated calcium carbonate can be made available in the quality required with a high degree of reproducibility and in an efficient manner.

In order to be able to determine the amount of coating agent, which must be used in order to obtain the desired properties, the average particular diameter of the calcium carbonate crystals is first of all determined. Different methods are known for determining the particle size.

Based on the method of Blaine, the average particle diameter (dp) is determined by measuring the air permeability of a compressed calcium carbonate tablet.

The particle surface area, required for determining the necessary amount of coating agent, is obtained from the following equation:

average specific surface area of the particles, assuming that they are spheres=

$$\frac{4\pi(dp/2)^2}{(4/3)\pi(dp/2)^3 \times d}$$

The density (d) of calcitic calcium carbonate is $2.71 \times 10^6$ g/m$^3$ and of aragonitic calcium carbonate $2.93 \times 10^6$ g/m$^3$.

Accordingly, the average specific surface area of the particles, assuming that they are spheres, is 2.21/dp (m$^2$/g) for calcitic calcium carbonate and 2.05/dp (m$^2$/g) for aragonitic calcium carbonate. The amount of coating agent, required for the desired degree of coating, is obtained from the following Equation 1:

coating agent(g)=degree of coverage(g/m$^2$)×(5.99/d×dp) (m$^2$/g)× CaCo$_3$(g)

Based on this relationship, it is possible to add the exact amount of coating agent and to produce calcium carbonate with constant properties, which meet the requirements of the intended applications.

The calcium carbonate, coated pursuant to the invention, has a high functionality as a mixing component, for example, for polymers, polymer preparations, plastics, coating compositions, sealing compositions, paper, paints, pigments and especially printing inks.

The following examples are intended to explain the invention without limiting it.

EXAMPLE 1

Preparation of Precipitated Calcium Carbonate (CCP)

The temperature of milk of lime, having a concentration of 150 g/L is adjusted in a vessel to 18° C. After this starting temperature is reached, carbon dioxide is introduced into the vessel, with the rate of $CO_2$ introduction being maintained constant.

Conditions $CO_2$-Air mixture: 30:70

$CO_2$ Supply: 1 m$^3$ per hour per 10 liters of milk of lime
Precipitation time: 100 minutes

EXAMPLE 2

Preparation of the Coating Agent

Water (1035 g) is heated to 75° C., 157.5 g of stearic acid are added and the mixture is stirred for 15 minutes. 60 ml of a 25% ammonium hydroxide solution is added with stirring and the mixture is homogenized for 30 minutes. A light, homogeneous emulsion is obtained containing 12.6% by weight stearic acid.

EXAMPLE 3

Calcium Carbonate Coating

The average particle diameter was determined by a method based on that of Blaine.

Calcitic calcium carbonate dp=0.067 μm

The desired liquid limit in the plasticizer mixture is 260 Pa.

By means of a calibration curve, the degree of coating, required for this liquid limit, is determined to be 0.00058 g/m$^2$.

The amount of coating agent required is calculated with Equation 1 and is 1.9 g/100 g of calcium carbonate.

To 20 liters of the suspension prepared according to Example 1, 602 g of the coating agent prepared according to Example 2, are added and stirred for one hour at 75° C. The coated calcium carbonate is separated, dried and ground.

The following Table shows the results of Examples 4 to 8, in calcium carbonate was treated analogously to Examples 1 to 3.

TABLE

| Example | dp (μm) | Degree of Coating (g of stearic acid/ m$^2$ of Particle Surface) | Amount of Stearic Acid (g of stearic acid/ 100 g of Calcium Carbonate) | Liquid Limit in the Plasticizer Mixture According to Bingham (Pa) |
|---|---|---|---|---|
| 4 | 0.59 | 0.00046 | 1.7 | 32 |
| 5 | 0.062 | 0.00056 | 2.0 | 288 |
| 6 | 0.061 | 0.00069 | 2.5 | 51 |
| 7 | 0.070 | 0.00094 | 3.0 | 82 |
| 8 | 0.098 | 0.00111 | 2.5 | 123 |

EXAMPLE 9

| Preparation of a Composition to Protect the Subsoil | |
|---|---|
| Plasticizer, dioctyl phthalate | 55 g |
| Plasticizer, diisononyl phthalate | 60 g |
| PVC pasteable, Solvic 374 MIB | 70 g |
| PVC pasteable, Solvic 266 SF | 30 g |
| Fatty acid coated CaCO$_3$ acid as in Example 5 | 70.0 g |
| UV stabilizers, IRGASTAB 17MOK | 2.0 g |
| adhesion promoter, EURETEK 505 | 4.0 g |
| drying agent, calcium oxide | 5.0 g |
| Result: | |
| Liquid limit according to Bingham | 207 Pa |
| Viscosity at shear rate of 100/s | 6.9 Pas |
| Adhesion | very good |
| Dispersing quality/Grindometer | <35 μm |

EXAMPLE 10

| Preparation of an Offset Printing Ink | |
|---|---|
| Pigment, flushed, Eurolith Blue | 25.0% by weight |
| Fatty acid coated CaCO$_3$ as in Example 8 | 15.0% by weight |
| Pressure oil, Haltermann, PKWF 4/7 | 12.0% by weight |
| Binder, Uroset | 48.0% by weight |
| Result: | |
| Liquid limit | 35 Pa |
| Viscosity at a shear rate of 3/second | 11.3 Pas |

-continued

| Preparation of an Offset Printing Ink | |
|---|---|
| Depth of color C | 53 |
| Gloss 60° | 68% |

EXAMPLE 11

| Preparation of Polyurethane Compositions, 2-Component System | |
|---|---|
| Polyol, Desmophen 1150 | 150 g |
| Fatty acid coated CaCO$_3$ as in Example 7 | 60 g |
| Titanium oxide pigment (rutile), Tiona Rcl-535 | 3 g |
| Dry paste, Baylith L paste | 15 g |
| Adhesion promoter, Acronal 700L | 1 g |
| Plasticizer, Mesamoll II | 35 g |
| Polyurethane activator | 1 g |
| Isocyanate | 3 g |
| Result: | |
| Bingham liquid limit | 186 Pa |
| Viscosity at a shear rate of 100/sec | 5.9 Pas |
| Pot life time | 27 minutes |
| Adhesion | good |
| Dispersing quality/Grindometer | <35 μm |

EXAMPLE 12

| Preparation of Silicone Compositions | |
|---|---|
| For the testing, a non-curing silicone composition was prepared, which corresponds to a 2-component system in which the catalyst required for the curing was not added. | |
| Silicone polymer | 60 g |
| Fatty acid coated CaCO$_3$ as in Example 6 | 38 g |
| Plasticizer | 2 g |
| Result: | |
| Casson liquid limit | 988 Pa |
| Viscosity at a shear rate of 5/sec | 305 Pas |
| Dispersing quality/Grindometer | <35 μm |

What is claimed is:

1. Coated crystalline calcium carbonate particles comprising calcium carbonate particles having coated and uncoated surface areas, wherein the coated surface area is in the form of a double layer and comprises 20 to 60% of the crystalline surface, said coated calcium carbonate being obtained by contacting uncoated calcium carbonate particles in an aqueous system with an amount of coating agent determined according to the equation $$\text{coating agent}(g) = \text{degree of coverage}(g/m^2) \times (5.99/(d \times dp))(m^2/g) \times \text{CaCO}_3(g)$$

where (dp) represents the average particle diameter of the calcium carbonate particles, and (d) represents the density of the calcium carbonate.

2. A method for producing the coated crystalline calcium carbonate particles according to claim 1, comprising the step of contacting calcium carbonate particles with an amount of coating agent determined according to the equation $$\text{coating agent}(g) = \text{degree of coverage}(g/m^2) \times (5.99/(d \times dp))(m^2/g) \times \text{CaCO}_3(g)$$

wherein (dp) represents the average particle diameter of the calcium carbonate particles, and (d) represents the density of the calcium carbonate and drying.

3. A method according to claim 2, wherein the coating agent is added as an emulsion to a calcium carbonate suspension and is dispersed or emulsified with the calcium carbonate.

4. A method according to claim 2, wherein said calcium carbonate particles have an average particle diameter of at most 50 μm.

5. A method according to claim 4, wherein said calcium carbonate particles have an average particle diameter of less than 20 μm.

6. A method according to claim 7, wherein said calcium carbonate particles have an average particle diameter in the range from 0.005 to 5 μm.

7. A method according to claim 6, wherein said calcium carbonate particles have an average particle diameter in the range from 0.01 to 1 μm.

8. A method according to claim 2, wherein said coating agent is comprised of material which is held by surface activity on the calcium carbonate particles.

9. A method according to claim 2, wherein said coating agent is comprised of at least one saturated or unsaturated carboxylic acid or salt thereof or fatty alcohol, all of which have a carbon chain length of 2 to 32 carbon atoms.

10. A method according to claim 9, wherein said coating agent is comprised of at least one saturated or unsaturated carboxylic acid or salt thereof or fatty alcohol, all of which have a carbon chain length of 14 to 22 carbon atoms.

11. A method of filling a composition of matter, said method comprising introducing into said composition of matter a functional amount of coated calcium carbonate particles according to claim 1,
wherein said composition of matter is selected from the group consisting of polymers, polymer preparations, synthetic resins, paper, and paints.

12. A method of filling a composition of matter, said method comprising introducing into said composition of matter a functional amount of coated calcium carbonate particles according to claim 1,
wherein said composition of matter is selected from the group consisting of plastics, coating compositions, sealing compositions and printing inks.

* * * * *